United States Patent
McMahon et al.

(10) Patent No.: US 9,521,416 B1
(45) Date of Patent: Dec. 13, 2016

(54) SYSTEMS AND METHODS FOR IMAGE DATA COMPRESSION

(71) Applicant: Pelican Imaging Corporation, Santa Clara, CA (US)

(72) Inventors: Andrew Kenneth John McMahon, San Carlos, CA (US); Kartik Venkataraman, San Jose, CA (US)

(73) Assignee: KIP PELI P1 LP, New York, NY (US)

( * ) Notice: Subject to any disclaimer, the term of this patent is extended or adjusted under 35 U.S.C. 154(b) by 0 days.

(21) Appl. No.: 14/204,990

(22) Filed: Mar. 11, 2014

Related U.S. Application Data

(60) Provisional application No. 61/776,751, filed on Mar. 11, 2013.

(51) Int. Cl.
| | |
|---|---|
| H04N 19/102 | (2014.01) |
| H04N 19/42 | (2014.01) |
| H04N 19/46 | (2014.01) |
| H04N 19/132 | (2014.01) |
| H04N 19/423 | (2014.01) |

(52) U.S. Cl.
CPC ...... *H04N 19/132* (2014.11); *H04N 19/00484* (2013.01)

(58) Field of Classification Search
USPC ..................................................... 348/218.1
See application file for complete search history.

(56) References Cited

U.S. PATENT DOCUMENTS

| | | |
|---|---|---|
| 4,124,798 A | 11/1978 | Thompson |
| 4,198,646 A | 4/1980 | Alexander et al. |
| 4,323,925 A | 4/1982 | Abell et al. |
| 4,460,449 A | 7/1984 | Montalbano |
| 4,467,365 A | 8/1984 | Murayama et al. |
| 5,005,083 A | 4/1991 | Grage |
| 5,070,414 A | 12/1991 | Tsutsumi |
| 5,144,448 A | 9/1992 | Hornbaker |
| 5,327,125 A | 7/1994 | Iwase et al. |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |

(Continued)

FOREIGN PATENT DOCUMENTS

| | | |
|---|---|---|
| CN | 1839394 A | 9/2006 |
| EP | 840502 A2 | 5/1998 |

(Continued)

OTHER PUBLICATIONS

US 8,957,977, 02/2015, Venkataraman et al. (withdrawn)

(Continued)

*Primary Examiner* — Mark Monk
(74) *Attorney, Agent, or Firm* — KPPB LLP

(57) ABSTRACT

Systems and methods for image data compression in an array camera are disclosed. An array camera includes a processor, an array of cameras, and a compression module. The compression module is configured to receive image data from the array of pixels of a focal plane in a sequentially linear group of pixel data, analyze the received image data based upon truncation rules, compress the received data image based upon the analysis to generate compressed image data, and generate a bit mask identifying truncated image data in the compressed image data.

12 Claims, 9 Drawing Sheets

(56) References Cited

U.S. PATENT DOCUMENTS

| | | |
|---|---|---|
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,124,974 A | 9/2000 | Burger |
| 6,137,100 A | 10/2000 | Fossum et al. |
| 6,137,535 A | 10/2000 | Meyers |
| 6,141,048 A | 10/2000 | Meyers |
| 6,163,414 A | 12/2000 | Kikuchi et al. |
| 6,175,379 B1 | 1/2001 | Uomori et al. |
| 6,239,909 B1 | 5/2001 | Hayashi et al. |
| 6,358,862 B1 | 3/2002 | Ireland et al. |
| 6,443,579 B1 | 9/2002 | Myers et al. |
| 6,477,260 B1 | 11/2002 | Shimomura |
| 6,525,302 B2 | 2/2003 | Dowski, Jr. et al. |
| 6,563,537 B1 | 5/2003 | Kawamura et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,657,218 B2 | 12/2003 | Noda |
| 6,671,399 B1 | 12/2003 | Berestov |
| 6,765,617 B1 | 7/2004 | Tangen et al. |
| 6,771,833 B1 | 8/2004 | Edgar |
| 6,774,941 B1 | 8/2004 | Boisvert et al. |
| 6,795,253 B2 | 9/2004 | Shinohara |
| 6,819,358 B1 | 11/2004 | Kagle et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,606,484 B1 | 10/2009 | Richards et al. |
| 7,633,511 B2 | 12/2009 | Shum et al. |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,782,364 B2 | 8/2010 | Smith |
| 7,840,067 B2 | 11/2010 | Shen et al. |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,169,486 B2 | 5/2012 | Corcoran et al. |
| 8,180,145 B2 | 5/2012 | Wu et al. |
| 8,189,089 B1 | 5/2012 | Georgiev |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,254,668 B2 | 8/2012 | Mashitani et al. |
| 8,280,194 B2 | 10/2012 | Wong et al. |
| 8,289,409 B2 | 10/2012 | Chang |
| 8,289,440 B2 | 10/2012 | Pitts et al. |
| 8,294,099 B2 | 10/2012 | Blackwell, Jr. |
| 8,305,456 B1 | 11/2012 | McMahon |
| 8,345,144 B1 | 1/2013 | Georgiev et al. |
| 8,360,574 B2 | 1/2013 | Ishak et al. |
| 8,406,562 B2 | 3/2013 | Bassi et al. |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,854,462 B2 | 10/2014 | Herbin et al. |
| 8,866,920 B2 | 10/2014 | Venkataraman et al. |
| 8,878,950 B2 | 11/2014 | Lelescu et al. |
| 8,885,059 B1 | 11/2014 | Venkataraman et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 9,036,928 B2 | 5/2015 | Venkataraman et al. |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,055,233 B2 | 6/2015 | Venkataraman et al. |
| 9,060,124 B2 | 6/2015 | Venkataraman et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 2001/0005225 A1 | 6/2001 | Clark et al. |
| 2001/0019621 A1 | 9/2001 | Hanna et al. |
| 2002/0012056 A1 | 1/2002 | Trevino |
| 2002/0027608 A1 | 3/2002 | Johnson |
| 2002/0039438 A1 | 4/2002 | Mori et al. |
| 2002/0057845 A1 | 5/2002 | Fossum |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0163054 A1 | 11/2002 | Suda |

(56) References Cited

U.S. PATENT DOCUMENTS

| | | |
|---|---|---|
| 2002/0167537 A1 | 11/2002 | Trajkovic |
| 2002/0177054 A1 | 11/2002 | Saitoh et al. |
| 2003/0086079 A1 | 5/2003 | Barth et al. |
| 2003/0124763 A1 | 7/2003 | Fan et al. |
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0066454 A1 | 4/2004 | Otani et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0207836 A1 | 10/2004 | Chhibber et al. |
| 2004/0213449 A1 | 10/2004 | Safaee-Rad et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0132098 A1 | 6/2005 | Sonoda et al. |
| 2005/0134698 A1* | 6/2005 | Schroeder et al. ........ 348/218.1 |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0286612 A1 | 12/2005 | Takanashi |
| 2006/0002635 A1 | 1/2006 | Nestares et al. |
| 2006/0007331 A1 | 1/2006 | Izumi et al. |
| 2006/0023197 A1 | 2/2006 | Joel |
| 2006/0023314 A1 | 2/2006 | Boettiger et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0038891 A1 | 2/2006 | Okutomi et al. |
| 2006/0039611 A1 | 2/2006 | Rother et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0210186 A1 | 9/2006 | Berkner |
| 2006/0214085 A1 | 9/2006 | Olsen et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0008575 A1 | 1/2007 | Yu et al. |
| 2007/0024614 A1 | 2/2007 | Tam |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0268374 A1 | 11/2007 | Robinson |
| 2007/0296832 A1 | 12/2007 | Ota et al. |
| 2007/0296835 A1 | 12/2007 | Olsen et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0056302 A1* | 3/2008 | Erdal ............... H04L 29/06027 370/474 |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152296 A1 | 6/2008 | Oh et al. |
| 2008/0156991 A1* | 7/2008 | Hu et al. .................. 250/341.1 |
| 2008/0158259 A1 | 7/2008 | Kempf et al. |
| 2008/0158375 A1 | 7/2008 | Kakkori et al. |
| 2008/0174670 A1 | 7/2008 | Olsen et al. |
| 2008/0187305 A1 | 8/2008 | Raskar et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0291295 A1* | 11/2008 | Kato ..................... H04N 19/124 348/231.99 |
| 2008/0310501 A1 | 12/2008 | Ward et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0179142 A1 | 7/2009 | Duparre et al. |
| 2009/0180021 A1 | 7/2009 | Kikuchi et al. |

(56) References Cited

U.S. PATENT DOCUMENTS

| | | |
|---|---|---|
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0118127 A1 | 5/2010 | Nam et al. |
| 2010/0142839 A1 | 6/2010 | Lakus-becker |
| 2010/0157073 A1 | 6/2010 | Kondo et al. |
| 2010/0177411 A1 | 7/2010 | Hegde et al. |
| 2010/0195716 A1 | 8/2010 | Klein Gunnewiek et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0223237 A1* | 9/2010 | Mishra et al. ............... 707/693 |
| 2010/0231285 A1 | 9/2010 | Boomer et al. |
| 2010/0244165 A1 | 9/2010 | Lake et al. |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2011/0001037 A1 | 1/2011 | Tewinkle |
| 2011/0019243 A1 | 1/2011 | Constant, Jr. et al. |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0153248 A1 | 6/2011 | Gu et al. |
| 2011/0206291 A1 | 8/2011 | Kashani et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0234841 A1 | 9/2011 | Akeley et al. |
| 2011/0241234 A1 | 10/2011 | Duparre |
| 2011/0255745 A1 | 10/2011 | Hodder et al. |
| 2011/0261993 A1 | 10/2011 | Weiming et al. |
| 2011/0273531 A1 | 11/2011 | Ito et al. |
| 2011/0274366 A1 | 11/2011 | Tardif |
| 2011/0279721 A1 | 11/2011 | McMahon |
| 2011/0285866 A1 | 11/2011 | Bhrugumalla et al. |
| 2011/0285910 A1 | 11/2011 | Bamji et al. |
| 2011/0300929 A1 | 12/2011 | Tardif et al. |
| 2011/0310980 A1 | 12/2011 | Mathew |
| 2011/0317766 A1 | 12/2011 | Lim et al. |
| 2012/0012748 A1 | 1/2012 | Pain et al. |
| 2012/0023456 A1 | 1/2012 | Sun et al. |
| 2012/0026342 A1 | 2/2012 | Yu et al. |
| 2012/0039525 A1 | 2/2012 | Tian et al. |
| 2012/0044249 A1 | 2/2012 | Mashitani et al. |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147205 A1 | 6/2012 | Lelescu et al. |
| 2012/0153153 A1 | 6/2012 | Chang et al. |
| 2012/0155830 A1 | 6/2012 | Sasaki et al. |
| 2012/0176479 A1 | 7/2012 | Mayhew et al. |
| 2012/0188420 A1 | 7/2012 | Black et al. |
| 2012/0198677 A1 | 8/2012 | Duparre |
| 2012/0200734 A1 | 8/2012 | Tang |
| 2012/0219236 A1 | 8/2012 | Ali et al. |
| 2012/0224083 A1 | 9/2012 | Jovanovski et al. |
| 2012/0249550 A1 | 10/2012 | Akeley et al. |
| 2012/0249836 A1 | 10/2012 | Ali et al. |
| 2012/0262601 A1 | 10/2012 | Choi |
| 2012/0262607 A1 | 10/2012 | Shimura et al. |
| 2012/0268574 A1 | 10/2012 | Gidon et al. |
| 2012/0287291 A1 | 11/2012 | McMahon |
| 2012/0293695 A1 | 11/2012 | Tanaka |
| 2012/0314033 A1 | 12/2012 | Lee et al. |
| 2012/0327222 A1 | 12/2012 | Ng et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0050504 A1 | 2/2013 | Safaee-Rad et al. |
| 2013/0050526 A1 | 2/2013 | Keelan |
| 2013/0070060 A1 | 3/2013 | Chatterjee |
| 2013/0077880 A1 | 3/2013 | Venkataraman et al. |
| 2013/0077882 A1 | 3/2013 | Venkataraman et al. |
| 2013/0088489 A1 | 4/2013 | Schmeitz et al. |
| 2013/0088637 A1 | 4/2013 | Duparre |
| 2013/0128087 A1 | 5/2013 | Georgiev et al. |
| 2013/0147979 A1 | 6/2013 | McMahon et al. |
| 2013/0215108 A1 | 8/2013 | McMahon et al. |
| 2013/0229540 A1 | 9/2013 | Farina et al. |
| 2013/0230237 A1 | 9/2013 | Schlosser et al. |
| 2013/0259317 A1 | 10/2013 | Gaddy |
| 2013/0265459 A1 | 10/2013 | Duparre et al. |
| 2013/0293760 A1 | 11/2013 | Nisenzon et al. |
| 2014/0076336 A1 | 3/2014 | Clayton et al. |
| 2014/0079336 A1 | 3/2014 | Venkataraman et al. |
| 2014/0092281 A1 | 4/2014 | Nisenzon et al. |
| 2014/0098267 A1 | 4/2014 | Tian et al. |
| 2014/0118493 A1 | 5/2014 | Sali et al. |
| 2014/0118584 A1 | 5/2014 | Lee |
| 2014/0132810 A1 | 5/2014 | McMahon |
| 2014/0176592 A1 | 6/2014 | Wilburn et al. |
| 2014/0218546 A1 | 8/2014 | Mcmahon |
| 2014/0232822 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0369612 A1 | 12/2014 | Venkataraman et al. |

(56) References Cited

U.S. PATENT DOCUMENTS

| | | |
|---|---|---|
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0091900 A1 | 4/2015 | Yang et al. |
| 2015/0312455 A1 | 10/2015 | Venkataraman et al. |

FOREIGN PATENT DOCUMENTS

| | | |
|---|---|---|
| EP | 2336816 A2 | 6/2011 |
| JP | 59-025483 | 9/1984 |
| JP | 64-037177 | 7/1989 |
| JP | 02-285772 A | 11/1990 |
| JP | 2000209503 A | 7/2000 |
| JP | 2002252338 A | 9/2002 |
| JP | 2003163938 A | 6/2003 |
| JP | 2004221585 A | 8/2004 |
| JP | 2005295381 A | 10/2005 |
| JP | 2006033493 A | 2/2006 |
| JP | 2007520107 A | 7/2007 |
| JP | 2008507874 A | 3/2008 |
| JP | 2008258885 A | 10/2008 |
| JP | 2011109484 A | 6/2011 |
| JP | 2013526801 A | 6/2013 |
| KR | 1020110097647 A | 8/2011 |
| WO | 2007083579 A1 | 7/2007 |
| WO | 2008108926 A1 | 9/2008 |
| WO | 2009151903 A2 | 12/2009 |
| WO | 2011063347 A2 | 5/2011 |
| WO | 2011116203 A1 | 9/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014032020 A3 | 5/2014 |
| WO | 2014078443 A1 | 5/2014 |
| WO | 2014130849 A1 | 8/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014165244 A1 | 10/2014 |
| WO | 2015048694 A1 | 4/2015 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
Extended European Search Report for European Application EP12835041.0, Report Completed Jan. 28, 2015, Mailed Feb. 4, 2015, 6 Pgs.
International Search Report and Written Opinion for International Application PCT/US2014/024903 report completed Jun. 12, 2014, Mailed Jun. 27, 2014, 13 pgs.
International Search Report and Written Opinion for International Application PCT/US14/17766, report completed May 28, 2014, Mailed Jun. 18, 2014, 9 Pgs.
International Search Report and Written Opinion for International Application PCT/US14/18084, Report completed May 23, 2014, Mailed Jun. 10, 2014, 12 pgs.
International Search Report and Written Opinion for International Application PCT/US2014/018116, report completed May 13, 2014, Mailed Jun. 2, 2014, 12 Pgs.
International Search Report and Written Opinion for International Application PCT/US2014/022118, report completed Jun. 9, 2014, Mailed Jun. 25, 2014, 5 pgs.
International Search Report and Written Opinion for International Application PCT/US2014/024407, report completed Jun. 11, 2014, Mailed Jul. 8, 2014, 9 Pgs.
International Search Report and Written Opinion for International Application PCT/US2014/025100, report completed Jul. 7, 2014, Mailed Aug. 7, 2014, 5 Pgs.
International Search Report and Written Opinion for International Application PCT/US2014/022123, report completed Jun. 9, 2014, Mailed Jun. 25, 2014, 5 pgs.
International Search Report and Written Opinion for International Application PCT/US2014/024947, report completed Jul. 8, 2014, Mailed Aug. 5, 2014, 8 Pgs.
International Search Report and Written Opinion for International Application PCT/US2014/030692, report completed Jul. 28, 2014, Mailed Aug. 27, 2014, 7 Pgs.
Chen et al., "Interactive deformation of Light Fields", In Proceedings of SIGGRAPH (I3D) 2005, pp. 139-146.
Chen et al., "KNN Matting", IEEE Transactions on Pattern Analysis and Machine Intelligence, Sep. 2013, vol. 35, No. 9, pp. 2175-2188.
Goldman et al., "Video Object Annotation, Navigation, and Composition", in Proceedings of UIST 2008, pp. 3-12.
Gortler et al., "The Lumigraph", In Proceedings of SIGGRAPH 1996, pp. 43-54.
Hasinoff et al., "Search-and-Replace Editing for Personal Photo Collections", Computational Photography (ICCP) 2010, pp. 1-8.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Joshi et al., "Synthetic Aperture Tracking: Tracking Through Occlusions", I CCV IEEE 11th International Conference on Computer Vision, Oct. 2007, Retrieved from http://ieeexplore.ieee.org/stamp/stamp.jsp?tp=&arnumber=4409032&isnumber=4408819, on Retrieved Jul. 28, 2014, pp. 1-8.
Lai et al., "A Large-Scal Hierarchical Multi-View RGB-D Object Dataset", source and date unknown, 8 pgs.
Levin et al., "A Closed Form Solution to Natural Image Matting", Pattern Analysis and Machine Intelligence, Feb. 2008, vol. 30, 8 pgs.
Lo et al., "Stereoscopic 3D Copy & Paste", ACM Transactions on Graphics, vol. 29, No. 6, Article 147, Dec. 2010, pp. 147:1-147:10.
Perwass et al., "Single Lens 3D-Camera with Extended Depth-of-Field", printed from www.raytrix.de, 15 pgs.
Seitz et al., "Plenoptic Image Editing", International Journal of Computer Vision 48, 2, pp. 1-29.
Tallon et al., "Upsampling and Denoising of Depth Maps via Joint-Segmentation", 20th European Signal Processing Conference, Aug. 27-31, 2012, 5 pgs.
Zhang, Qiang et al., "Depth estimation, spatially variant image registration, and super-resolution using a multi-lenslet camera",

(56) References Cited

OTHER PUBLICATIONS

Proceedings of SPIE, vol. 7705, Apr. 23, 2010, pp. 770505-770505-8, XP055113797 ISSN: 0277-786X, DOI: 10.1117/12.852171.
International Search Report and Written Opinion for International Application No. PCT/US2014/066229, Search Completed Mar. 6, 2015, Mailed Mar. 19, 2015, 9 Pgs.
International Preliminary Report on Patentability for International Application No. PCT/US2013/056065, Report Issued Feb. 24, 2015, Mailed Mar. 5, 2015, 4 Pgs.
International Preliminary Report on Patentability for International Application PCT/US2013/056502, Report Issued Feb. 24, 2015, Mailed Mar. 5, 2015, 7 Pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE—IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=10.1.1.226.2643&rep=rep1&type=pdf>, Title pg., abstract, table of contents, pp. 1-263 (269 total pages), 2001.
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim. Syst. Sign Process, 2007, vol. 18, pp. 83-101.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs., Aug. 2009.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer, et al., "Optical System Design," 2nd EDITION, SPIE Press, pp. 191-198.
Fischer, et al., "Optical System Design," 2nd Edition, SPIE Press, pp. 49-58.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.

(56) References Cited

OTHER PUBLICATIONS

Kutulakos et al., "Occluding Contour Detection Using Affine Invariants and Purposive Viewpoint Control", Proc., CVPR 94, 8 pgs.
Lensvector, "How LensVector Autofocus Works", http://www.lensvector.com/overview.html.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Muehlebach, Michael, "Camera Auto Exposure Control for VSLAM Applications", Studies on Mechatronics.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative back projection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander, et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intel., 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Vuong et al., "A New Auto Exposure and Auto White-Balance Algorithm to Detect High Dynamic Range Conditions Using CMOS Technology".
Wang, "Calculation Image Position, Size and Orientation Using First Order Properties".
Wang, Yuhao, "Calculation of Image Position, Size and Orientation Using First Order Properties".
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)".
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang, et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zomet et al., "Robust Super-Resolution", IEEE, 2001, pp. 1-6.
International Search Report and Written Opinion for International Application No. PCT/US13/46002, Search Completed Nov. 13, 2013, Mailed Nov. 29, 2013, 7 pgs.
International Search Report and Written Opinion for International Application No. PCT/US13/48772, Search Completed Oct. 21, 2013, Mailed Nov. 8, 2013, 6 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US13/59991, Search Completed Feb. 6, 2014, Mailed Feb. 26, 2014, 8 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/056502, Search Completed Feb. 18, 2014, Mailed Mar. 19, 2014, 7 pgs.

(56) References Cited

OTHER PUBLICATIONS

International Search Report and Written Opinion for International Application No. PCT/US2013/069932, International Filing Date Nov. 13, 2013, Search Completed Mar. 14, 2014, Mailed Apr. 14, 2014, 12 pgs.
International Search Report and Written Opinion for International Application PCT/US11/36349, mailed Aug. 22, 2011, 12 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US2012/37670, Mailed Jul. 18, 2012, Search Completed Jul. 5, 2012, 9 pgs.
International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop, et al., "Full-Resolution Depth Map Estimation from an Aliased Plenoptic Light Field", ACCV 2010, Part II, LNCS 6493, pp. 186-200, 2011.
Bishop, et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc. SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in Non-Gaussian Image Models", Proc. SPIE, 1998. 3459, 9 pgs.
Mitra et al., "Light Field Denoising, Light Field Superresolution and Stereo Camera Based Refocussing using a GMM Light Field Patch Prior", Computer Vision and Pattern Recognition Workshops (CVPRW), IEEE Computer Society Conference on Jun. 16-21, 2012, pp. 22-28.
International Preliminary Report on Patentability for International Application PCT/US2013/069932, Report issued May 19, 2015, Mailed May 28, 2015, 14 Pgs.
International Preliminary Report on Patentability for International Application PCT/US2014/017766, Report issued Aug. 25, 2015, Mailed Sep. 3, 2015, 8 Pgs.
International Preliminary Report on Patentability for International Application PCT/US2014/022118, Report issued Sep. 8, 2015, Mailed Sep. 17, 2015, 4pgs.
International Preliminary Report on Patentability for International Application PCT/US2014/022123, Report issued Sep. 8, 2015, Mailed Sep. 17, 2015, 4 Pgs.
International Preliminary Report on Patentability for International Application PCT/US2014/024407, Report issued Sep. 15, 2015, Mailed Sep. 24, 2015, 8 Pgs.
International Preliminary Report on Patentability for International Application PCT/US2014/024903, Report issued Sep. 15, 2015, Mailed Sep. 24, 2015, 12 Pgs.
International Preliminary Report on Patentability for International Application PCT/US2014/024947, Report issued Sep. 15, 2015, Mailed Sep. 24, 2015, 7 Pgs.
International Preliminary Report on Patentability for International Application PCT/US2014/025100, Report issued Sep. 15, 2015, Mailed Sep. 24, 2015, 4 Pgs.
International Search Report and Written Opinion for International Application No. PCT/US2015/019529, Search completed May 5, 2015, Mailed Jun 8, 2015, 10 Pgs.
International Search Report and Written Opinion for International Application PCT/US2010/057661, completed Mar. 9, 2011, 14 pgs.
Merkle, Philipp et al., "Adaptation and optimization of coding algorithms for mobile 3DTV", Mobile3DTV Project No. 216503, Nov. 2008, 55 pgs.
Philips 3D Solutions, "3D Interface Specifications, White Paper", Philips 3D Solutions retrieved from www.philips.com/3dsolutions, 29 pgs., Feb. 15, 2008.

* cited by examiner

Column

| | A | B | C | D | E | F |
|---|---|---|---|---|---|---|
| 1 | A1 | | | | | F1 |
| 2 | | | | | | |
| 3 | | | | | | |
| 4 | | | | | | |
| 5 | | | | | | |
| 6 | | | | | | |

Row 152    152

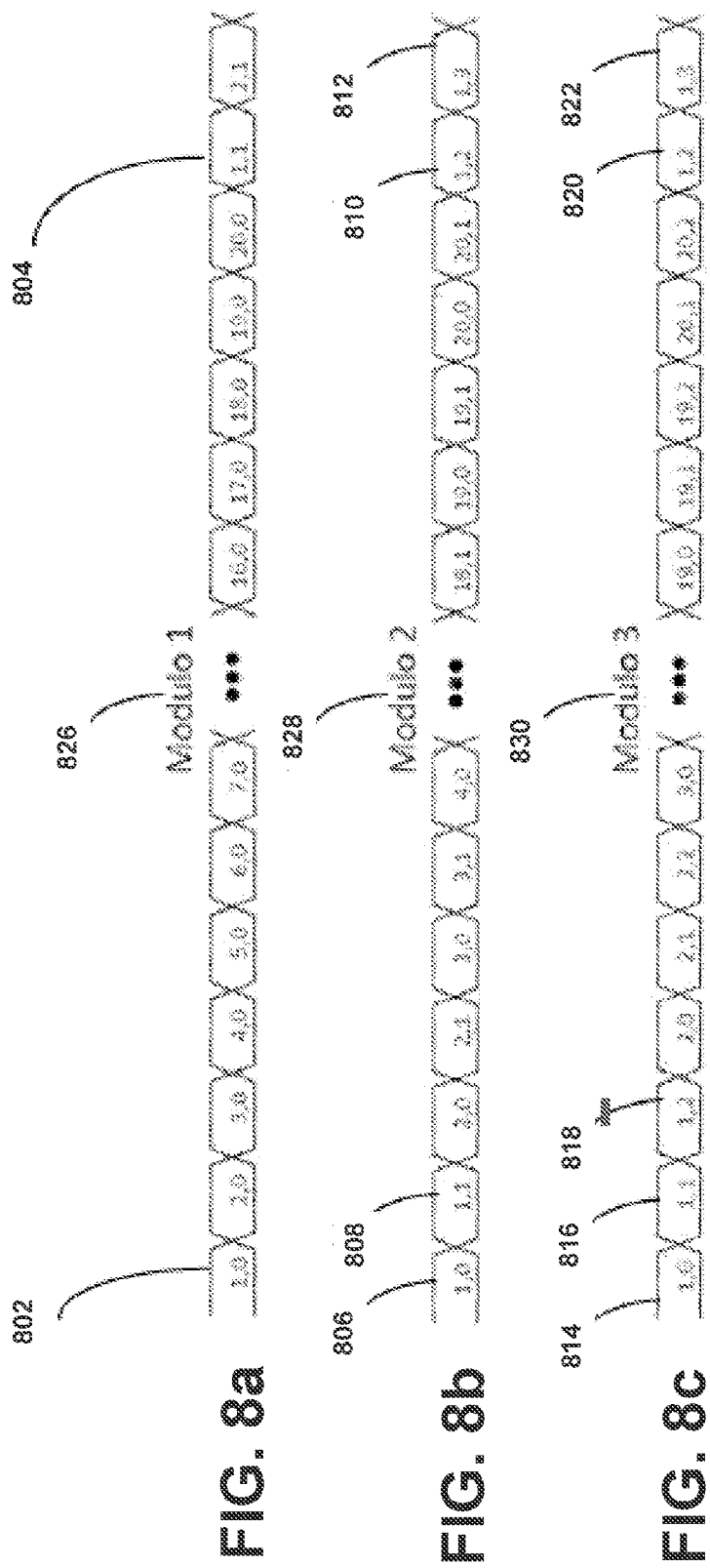

SYSTEMS AND METHODS FOR IMAGE DATA COMPRESSION

CROSS-REFERENCE TO RELATED APPLICATIONS

The current application claims priority to U.S. Provisional Patent Application No. 61/776,751 entitled "System and Methods for Image Data Compression," filed Mar. 11, 2013, the disclosure of which is incorporated herein by reference.

FIELD OF THE INVENTION

The present invention is generally related to array cameras and more specifically to data compression of image data captured by focal planes within an array camera for bandwidth reduction.

BACKGROUND OF THE INVENTION

In a typical camera, light enters through an opening (aperture) at one end of the camera and is directed to a focal plane by a lens stack. The lens stack creates an optical channel that forms an image of a scene upon the focal plane. The focal plane includes an array of light sensitive pixels, which are part of a sensor that generates signals upon receiving light via the optical channel. Commonly used sensors include CCD (charge-coupled device) sensors and CMOS (complementary metal-oxide-semiconductor) sensors.

Traditional cameras typically use a single focal plane to capture single images, one at a time. The image data from each pixel of the focal plane is then sent directly from the focal plane to a processor. The processor can manipulate the image data, such as to encode or modify the image data.

SUMMARY OF THE INVENTION

Systems and methods for image data compression in an array camera are disclosed. In accordance with embodiments of the invention, an array camera includes a processor, a camera module, and a compression module. The camera module includes an imager array and an optic array of lens stacks. Each focal plane of the imager array includes rows of pixels that also form columns of pixels and is contained within a region of the imager array that does not contain pixels from another focal plane. An image is formed on each active focal plane by a separate lens stack in said optic array of lens stacks. A compression module is configured to receive image data from the array of pixels of a focal plane in a sequentially linear group of pixel data, analyze the received image data based upon truncation rules, compress the received data image based upon the analysis to generate compressed image data, and generate a bit mask identifying truncated image data in the compressed image data.

BRIEF DESCRIPTION OF THE DRAWINGS

FIG. 1B conceptually illustrates a focal plane from an imager array in accordance with an embodiment of the invention.

FIGS. 8a, 8b, and 8c conceptually illustrate lines of image data transmitted by interleaving image data from multiple focal planes using modulo processes in accordance with an embodiment of the invention.

DETAILED DESCRIPTION

Figure 1A:
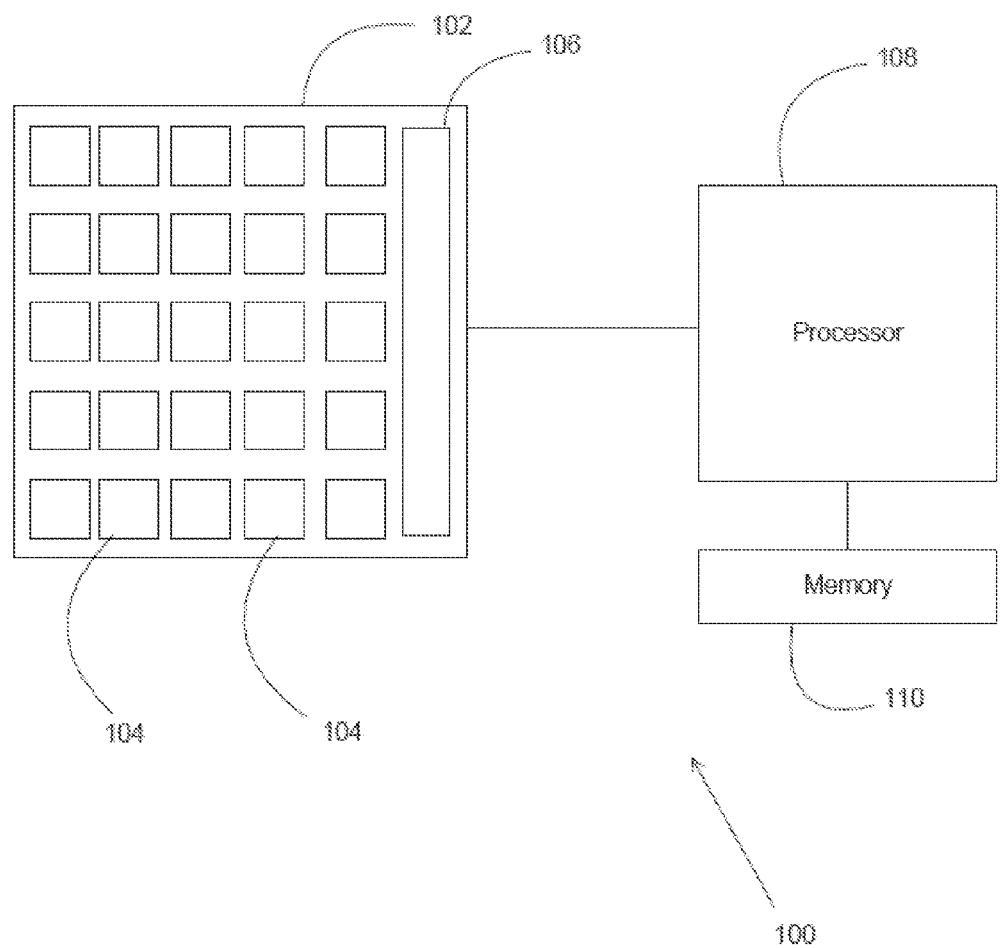
FIG. 1A conceptually illustrates an array camera in accordance with an embodiment of the invention.

Turning now to the drawings, systems and methods for compressing image data captured by individual pixels from focal planes of an imager array in an array camera in accordance with embodiments of the invention are illustrated. Array cameras are discussed in U.S. patent application Ser. No. 13/106,797 entitled "Architectures for Imager Arrays and Array Cameras" and U.S. patent application Ser. No. 12/952,106 entitled "Capturing and Processing of Images Using Monolithic Camera Array with Heterogeneous Imagers" the disclosures of both applications are hereby incorporated by reference in their entirety. In several embodiments, an array camera includes a camera module constructed using an imager array and a lens stack array, which combine to form a plurality of cameras. The cameras capture image data, which can be provided via an interface to a processor that can perform processes including synthesizing high resolution images from the individual images captured by the cameras in the camera module using super-resolution processing. Super-resolution processing is discussed in U.S. patent application Ser. No. 12/967,807 entitled "Systems and Methods for Synthesizing High Resolution Images Using Super-Resolution Processes", filed Dec. 14, 2010, the disclosure of which is hereby incorporated by reference in its entirety.

In several embodiments, compressed image data is truncated image data along with at least one associated bitmask. In certain embodiments, image data is truncated by removing redundant or unwanted image data generated by one or more focal planes while a bitmask is generated that notes the truncation for reference in conjunction with the truncated image data. A processor using a decompression process can utilize a bit mask and compressed image data to reconstruct image data captured by the focal planes of an array camera. In many embodiments, the image data is truncated using a compression module to identify redundant image data. While much of the discussion that follows relates to truncation of image data captured by a single focal plane, similar processes can be utilized to truncate image data captured by multiple focal planes (e.g. image data from different focal planes that sample similar portions of the object space of a scene). Accordingly, truncation processes in accordance with embodiments of the invention should be understood as not limited to application image data captured by a single focal plan.

In a number of embodiments, digital logic is utilized to analyze image data in a compression module to determine whether the image data can be compressed by truncating redundant image data. The digital logic can be configured in accordance with any criteria for data compression, including (but not limited to) whether a pixel value is redundant with respect to neighboring pixel values or simply to omit a certain amount of image data to comply with certain bandwidth constraints. In several embodiments, redundancy can be determined based upon adjacent pixel values having the same intensity value, intensity values within a predetermined threshold distance, and/or intensity values within a threshold based upon the noise characteristics of the sensor. Each pixel value can be analyzed to determine if the image data should be transmitted or omitted. The decision can be stored in a digital memory element as either a 1 or a 0 as part of a bitmask. After the image data is truncated, the truncated image data along with the bitmask can be sent to a processor. The processor can perform a decompression process by utilizing the bitmask and truncated image data to generate an image representative of the scene captured by the focal plane from which truncated image data is generated. In many embodiments, the decompression process can configure the processor to use a bitmask to decompress the truncated image data to produce a complete set of image data corresponding to every pixel location within a focal plane.

Systems and methods for compressing image data captured by pixels within a focal plane of an imager array in accordance with embodiments of the invention are discussed further below.

System Architecture

Array cameras in accordance with many embodiments of the invention can include a camera module, compression module and a processor. The camera module can include an array of cameras. A camera module can also include an imager array, which is a sensor that includes an array of focal planes. Each focal plane includes an array of pixels used to capture an image formed on the focal plane by a lens stack. The focal plane can be formed of, but is not limited to, traditional CIS (CMOS Image Sensor), CCD (charge-coupled device), high dynamic range sensor elements, multispectral sensor elements and various alternatives thereof. In many embodiments, the pixels of each focal plane have similar physical properties and receive light through the same lens stack. Furthermore, the pixels in each focal plane may be associated with the same color filter. In a number of embodiments, at least one of the focal planes includes a Bayer-pattern filter. In several embodiments, the focal planes are independently controlled. In other embodiments, the operation of the focal planes in the imager array is controlled via a single set of controls.

An array camera in accordance with an embodiment of the invention is illustrated in FIG. 1A. The array camera 100 includes a camera module 102 that is configured to transmit image data to a processor 108. The processor 108 is connected to a memory 110. The camera module 102 includes an array of cameras 104. The cameras 104 in the camera module 102 are formed from the combination of a lens stack and a focal plane. The camera module 102 can include an optic array of lens stacks and an imager array of focal planes. These multiple cameras 104 may be active or inactive at any given time. Array cameras are discussed in U.S. patent application Ser. No. 13/106,797 entitled "Architectures for Imager Arrays and Array cameras" and U.S. patent application Ser. No. 12/952,106 entitled "Capturing and Processing of Images using Monolithic Camera Array with Heterogeneous Imagers", the disclosures of both applications are hereby incorporated by reference in their entirety. The image data captured by these multiple cameras is sent from the focal planes of each camera to a processor via a compression module 106 resident in the camera module. In certain embodiments, the compression module is integrated within the imager array. The compression module 106 compresses the image data by truncating the image data and generating a bitmask describing the truncation of the image data, thereby compressing image data sent from each focal plane to the processor 108.

Figure 1B:
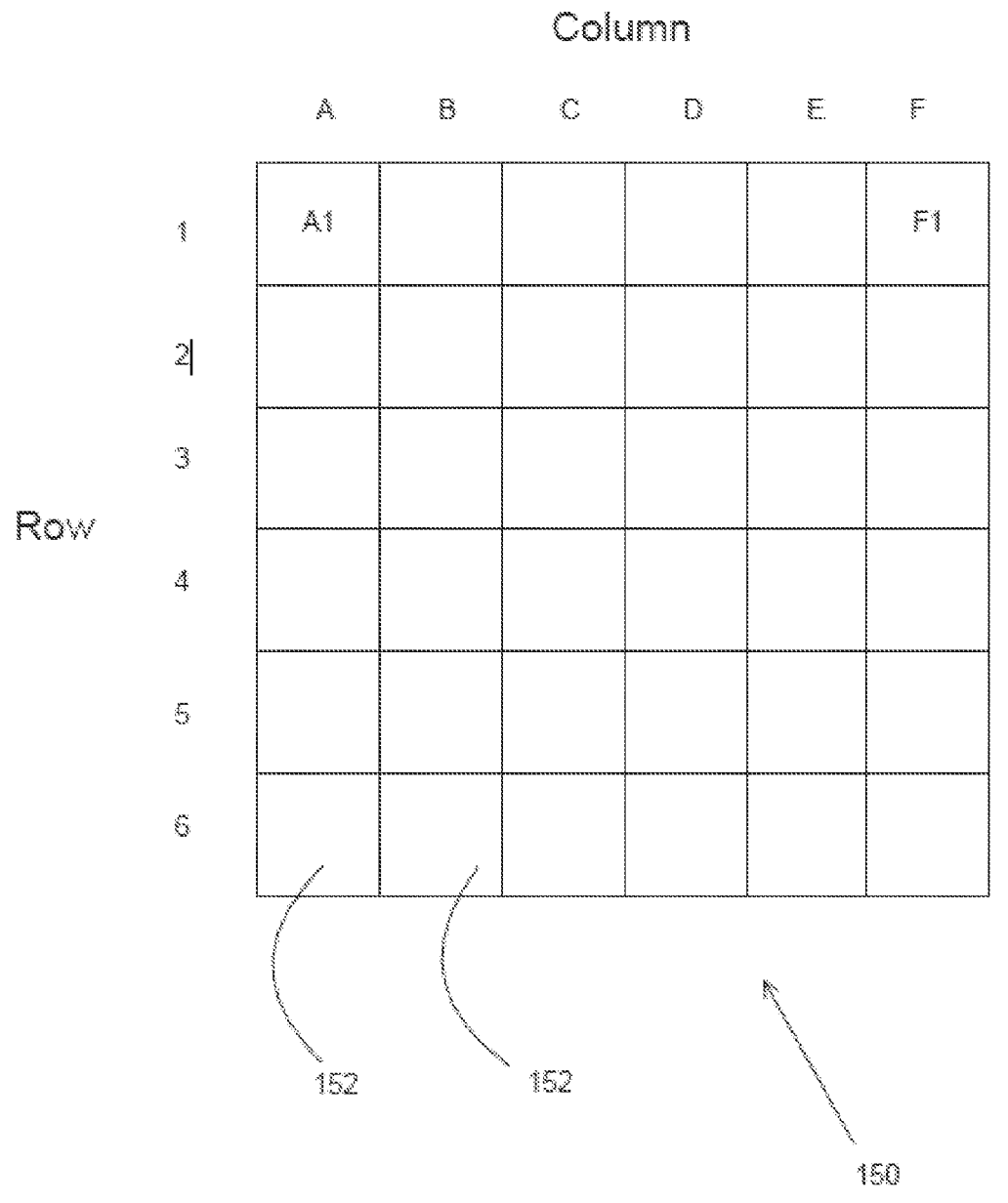

A single focal plane of the array camera of FIG. 1A in accordance with an embodiment of the invention is illustrated in FIG. 1B. The focal plane 150 is composed of a square array of pixels 152. Each pixel of the focal plane can generate image data as a pixel value based upon the intensity of light incident upon the pixel and the exposure and analog gain settings of the pixel. That image data can be compressed using a compression module that truncates redundant image data.

In many embodiments, the array camera captures images using a plurality of cameras, which can have different imaging characteristics. The array camera can separately control each of the cameras to obtain enhanced image capture and/or to enhance processes such as (but not limited to) super-resolution processes that may be applied to the captured images. For example, each pixel of a focal plane can capture different wavelengths of light, or can capture the intensity of light, varying exposure times, start times, or end times relative to each pixel of a different focal plane. Once the array camera has commenced capturing image data using the pixels on the imager array, the focal planes can commence transmitting the image data captured using the pixels. The image data can be compressed using a compression module and the compressed image data transmitted to the processor.

Although specific array camera system architectures are discussed above, any of a variety of system architectures for array cameras can be utilized as appropriate to the requirements of a specific application in accordance with embodiments of the invention. Camera modules in accordance with embodiments of the invention are discussed further below.

Camera Modules

Figure 2:
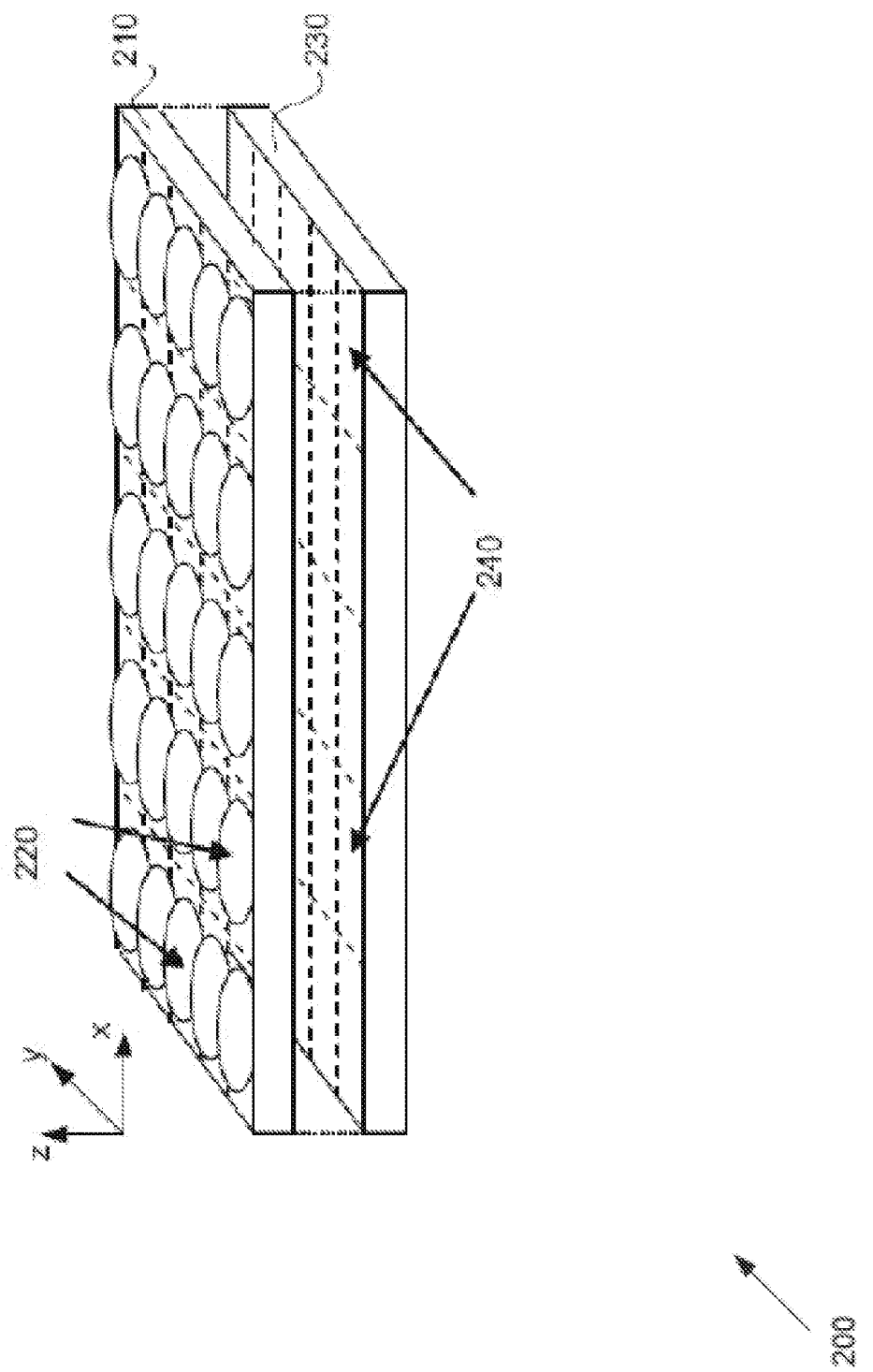
FIG. 2 conceptually illustrates an optic array and an imager array in an array camera module in accordance with an embodiment of the invention.

Camera modules in accordance with embodiments of the invention can be constructed from an imager array and an optic array. A camera module in accordance with an embodiment of the invention is illustrated in FIG. 2. The camera module 200 includes an imager array 230 including an array of focal planes 240 along with a corresponding optic array 210 including an array of lens stacks 220. Within the array of lens stacks, each lens stack 220 creates an optical channel that forms an image of the scene on an array of light sensitive pixels within a corresponding focal plane 240. Each pairing of a lens stack 220 and focal plane 240 forms a single camera 104 within the camera module. Each pixel within a focal plane 240 of a camera 104 generates image data that can be sent from the camera 104 to the processor 108. In many embodiments, the lens stack within each optical channel is configured so that pixels of each focal plane 240 sample the same object space or region within the scene. In several embodiments, the lens stacks are configured so that the pixels that sample the same object space do so with sub-pixel offsets to provide sampling diversity that can be utilized to recover increased resolution through the use of super-resolution processes.

In several embodiments, color filters in individual cameras can be used to pattern the camera module with π filter groups as further discussed in U.S. Provisional Patent Application No. 61/641,165 entitled "Camera Modules Patterned with pi Filter Groups" filed May 1, 2012, the disclosure of which is incorporated by reference herein in its entirety.

These cameras can be used to capture data with respect to different colors, or a specific portion of the spectrum. In contrast to applying color filters to the pixels of the camera, color filters in many embodiments of the invention are included in the lens stack. For example, a green color camera can include a lens stack with a green light filter that allows green light to pass through the optical channel. In many embodiments, the pixels in each focal plane are the same and the light information captured by the pixels is differentiated by the color filters in the corresponding lens stack for each filter plane. Although a specific construction of a camera module with an optic array including color filters in the lens stacks is described above, camera modules including π filter groups can be implemented in a variety of ways including (but not limited to) by applying color filters to the pixels of the focal planes of the camera module similar to the manner in which color filters are applied to the pixels of a conventional color camera. In several embodiments, at least one of the cameras in the camera module can include uniform color filters applied to the pixels in its focal plane. In many embodiments, a Bayer filter pattern is applied to the pixels of one of the cameras in a camera module. In a number of embodiments, camera modules are constructed in which color filters are utilized in both the lens stacks and on the pixels of the imager array.

Although specific array camera modules are described above, any of a variety of techniques can be utilized to construct array cameras in accordance with embodiments of the invention. Imager arrays that can be utilized in the construction of monolithic array camera modules in accordance with embodiments of the invention are discussed further below.

Imager Arrays

Figure 3:
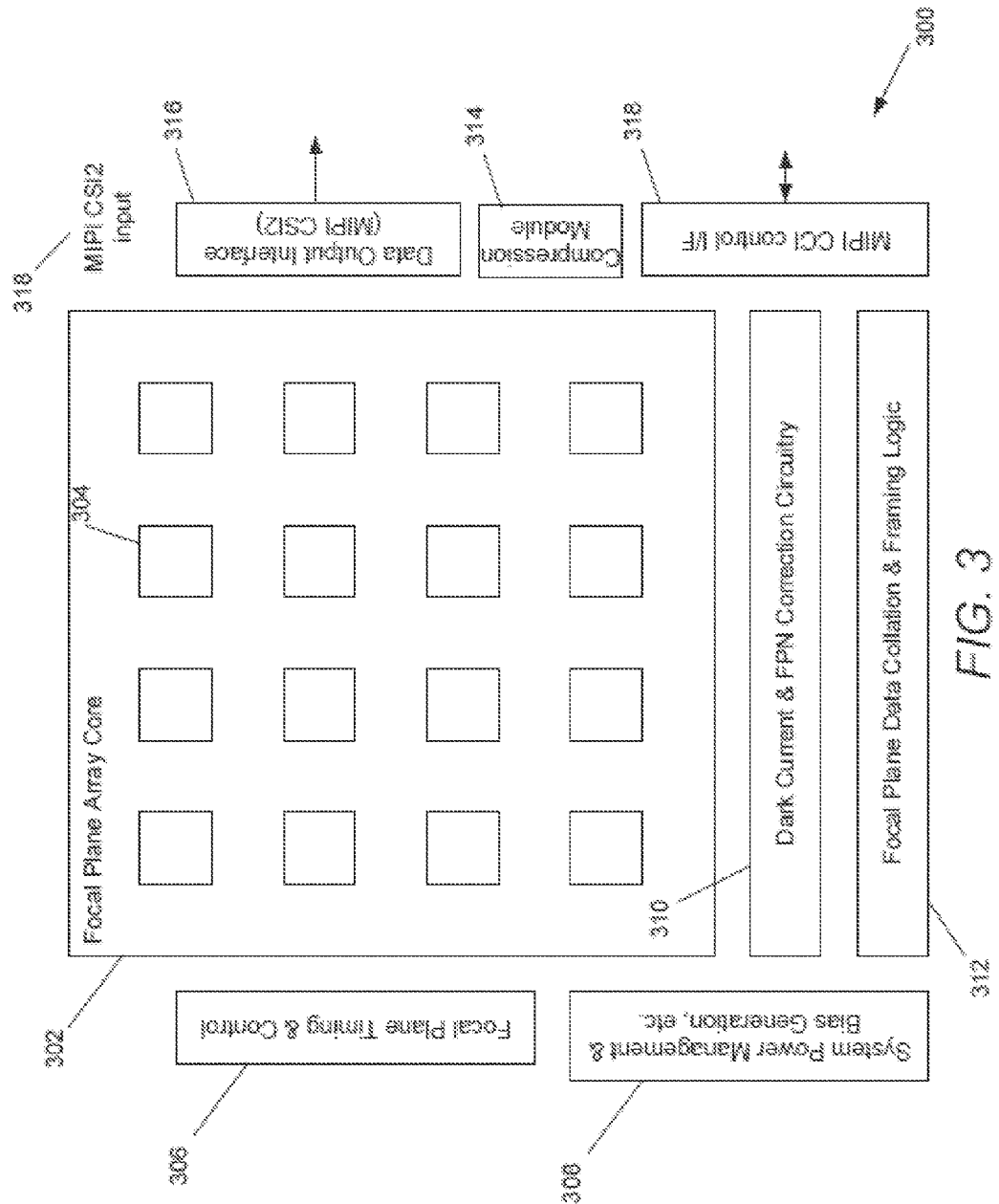
FIG. 3 is an architecture diagram of an imager array in accordance with an embodiment of the invention.

An imager array in which the image capture settings of a plurality of focal planes can be independently configured in accordance with an embodiment of the invention is illustrated in FIG. 3. The imager array 300 includes a focal plane array core 302 that includes an array of focal planes 304 and all analog signal processing, pixel level control logic, signaling, and analog-to-digital conversion (ADC) circuitry. The imager array also includes focal plane timing and control circuitry 306 that is responsible for controlling the capture of image data using the pixels. In a number of embodiments, the focal plane timing and control circuitry utilizes reset and read-out signals to control the integration time of the pixels. In other embodiments, any of a variety of techniques can be utilized to control integration time of pixels and/or to capture image data using pixels. In many embodiments, the focal plane timing and control circuitry 306 provides flexibility of image data capture control, which enables features including (but not limited to) high dynamic range imaging, high speed video, and electronic image stabilization. In various embodiments, the imager array includes power management and bias generation circuitry 308. The power management and bias generation circuitry 308 provides current and voltage references to analog circuitry such as the reference voltages against which an ADC would measure the signal to be converted against. In many embodiments, the power management and bias circuitry also includes logic that turns off the current/voltage references to certain circuits when they are not in use for power saving reasons. In several embodiments, the imager array includes dark current and fixed pattern noise (FPN) correction circuitry 310 that increases the consistency of the black level of the image data captured by the imager array and can reduce the appearance of row temporal noise and column fixed pattern noise. In several embodiments, each focal plane includes reference pixels for the purpose of calibrating the dark current and FPN of the focal plane and the control circuitry can keep the reference pixels active when the rest of the pixels of the focal plane are powered down in order to increase the speed with which the imager array can be powered up by reducing the need for calibration of dark current and FPN.

In many embodiments, a single self-contained chip imager includes focal plane framing circuitry 312 that packages the data captured from the focal planes into a container file and can prepare the captured image data for transmission. In several embodiments, the focal plane framing circuitry includes information identifying the focal plane and/or group of pixels from which the captured image data originated. In a number of embodiments, the imager array also includes an interface for transmission of captured image data to external devices. Image data provided to the interface can be directed through a compression module 314 that compresses the image data using any of a variety of compression processes discussed in more detail below. In the illustrated embodiment, the interface is a MIPI CSI 2 output interface (as specified by the non-profit MIPI Alliance, Inc.) supporting four lanes that can support read-out of video at 30 fps from the imager array and incorporating data output interface circuitry 316, interface control circuitry 318. Typically, the bandwidth of each lane is optimized for the total number of pixels in the imager array and the desired frame rate. The use of various interfaces including the MIPI CSI 2 interface to transmit image data captured by an array of imagers within an imager array to an external device in accordance with embodiments of the invention is described in U.S. Pat. No. 8,305,456, entitled "Systems and Methods for Transmitting Array Camera Data", issued Nov. 6, 2012, the disclosure of which is incorporated by reference herein in its entirety.

Although specific components of an imager array architecture are discussed above with respect to FIG. 3, any of a variety of imager arrays can be constructed in accordance with embodiments of the invention that enable the capture of images of a scene at a plurality of focal planes in accordance with embodiments of the invention. The compression and transmission of image data captured by a plurality of focal planes in an imager array and a bitmask that enables a processor to construct reconstruct the image data from the compressed image data in accordance with embodiments of the invention is discussed further below.

Image Data Compression

Image data in accordance with many embodiments of the invention can be compressed utilizing a compression module that truncates image data from a row of pixels. The image data can be truncated according to digital logic resident in the compression module that detects for redundancies among image data read out from pixels within rows (or columns) of pixels, such as but not limited to truncating redundant pixel values from neighboring pixels along a row (or column) of pixels such that less than all of the redundant values from neighboring pixels are transmitted from a focal plane to a processor. A bitmap can also be generated by the compression module and sent to the processor that receives the compressed image data such that the processor using a decompression process can reconstruct the uncompressed image data.

A truncation rule can be set in accordance with any constraint to determine whether to truncate or transmit pixel values. In certain embodiments, a truncation rule can require that a certain amount of image data must be omitted to achieve a particular output bandwidth constraint. A particular embodiment can dictate that at most image data from 75% of the pixels of a focal plane can be transmitted to achieve a bandwidth usage target. In other embodiments, any of a variety of criteria can be utilized to control the compression process to achieve a target bandwidth.

In many embodiments, image data can be compressed by truncating redundant or unwanted image data such that only image data from pixels that contain important information is transmitted to a processor. Compression modules can store image data as pixel values in a shift register from pixels across a row of pixels temporarily, allowing for digital logic to quickly analyze image data relative to neighboring pixels to determine whether pixel values from certain pixels should be truncated. The shift register can be implemented as a cascade of flip flops that share the same clock signal. Shifting at a transition of the clock signal causes the image data stored in the shift register to shift by one position, enabling the compression module to load in and shift out pixel values one pixel value at a time. This also enables simultaneous access to pixel intensity values from adjacent pixels. In many embodiments, intensity values from adjacent pixels from a row or column of pixels are analyzed. In many embodiments, a compression module with a shift register 3 words deep can store pixel values from three different pixels, thereby providing access to values from pixels in the present clock cycle's pixel, N, as well as pixels from the previous two consecutive clock cycles $N_{-1}$ and $N_{-2}$. Digital logic resident in the compression module can then analyze the pixel value stored at the clock cycle $N_{-1}$ for comparison to pixel value stored at clock cycle N and $N_{-2}$.

A number of redundancy criteria can be applied by the digital logic so as to determine if the pixel value at clock cycle $N_{-1}$ is worth transmitting. In many embodiments, a truncation rule can be utilized to determine a threshold of redundancy beyond which pixel values are truncated. In certain embodiments, the truncation rule can utilize the following relationship:

$$K=(2*N_{-1})-N-N_{-2}$$

Where only when K>threshold, is the pixel value at clock cycle $N_{-1}$ transmitted. This configurable threshold could be set to, for example, the noise floor of the focal plane or alternatively be additionally made a function of the intensity value of pixel $N_{-1}$ such that both the noise floor and photon shot noise can be used to set the threshold. If a particular pixel has K value less than the threshold, the image data from the pixel can be considered to be of no significance as being indistinguishable from noise. In other embodiments, any of a variety of criterion can be utilized to determine whether to truncate a pixel based upon the intensity values of one or more adjacent pixels in a row or column of pixels read out from a focal plane.

In a number of embodiments, a compression module can employ digital logic to determine whether compression of image data by truncation is necessary by determining if there is a compression advantage. In numerous embodiments, a compression advantage determines if transmitting compressed image data is advantageous relative to transmitting non compressed image data. This type of compression advantage can determine whether the combination of the truncated image data and the bitmask would require less bandwidth to transmit than merely uncompressed image data. In certain embodiments, a compression advantage is present when the number of pixel values truncated multiplied by the number of bits required to store a pixel value is larger than the number of bits in the bitmask.

In several embodiments, a bitmask can be created to record truncation of image data to be used by a processor using a decompression process to generate an image representative of the scene captured by the focal plane from which truncated image data is generated. In certain embodiments, a bitmask represents whether image data as pixel values from particular pixels is truncated as either a 1 or a 0 associated with the particular pixel in the bitmask. Thereby, in many embodiments, image data from a row of 1000 pixels would require memory of 1000 bits in size to store information in a bitmask. The location of bits within the bitmask indicates the location of each pixel in which image is truncated.

A focal plane can utilize one or multiple bitmasks in transmitting compressed image data. A bitmask can be inserted into a stream of truncated image data sent to a processor periodically, such as but not limited to being inserted with each row of truncated image data, or once upon successful transmission of image data associated with an entire focal plane.

Figure 4:
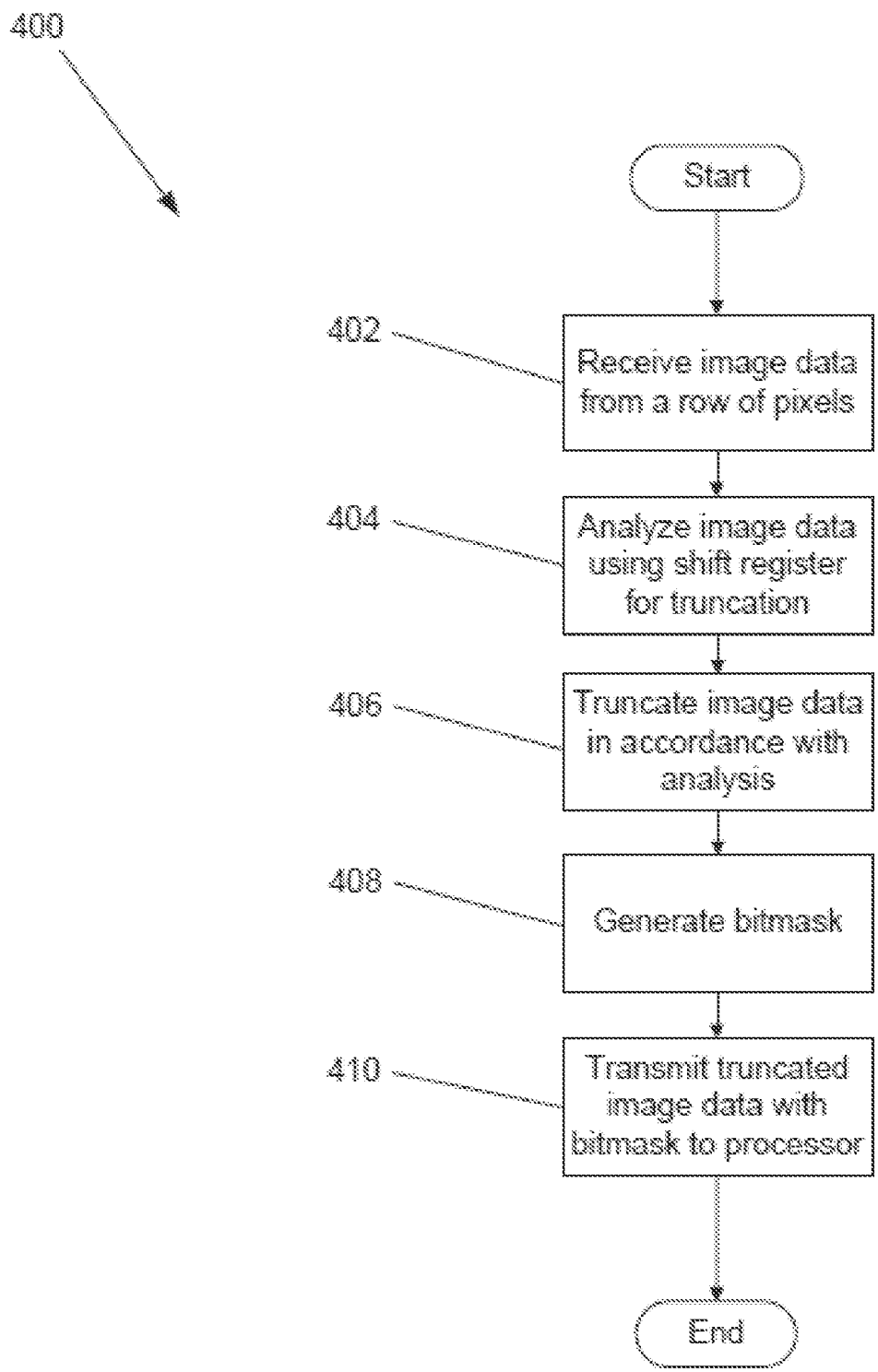
FIG. 4 illustrates a process for transmitting compressed image data in accordance with an embodiment of the invention.

A process for image data compression in accordance with an embodiment of the invention is illustrated in FIG. 4. The compression process 400 includes receiving (402) image data as pixel values from pixels in a row of pixels of a focal plane at a compression module. The image data can be analyzed (404) by digital logic resident on the compression module for compression. The analysis can be made in accordance with a truncation rule, such as (but not limited) to the various truncation rules described above. The compression can be achieved by truncating (406) image data from a row of pixels in accordance with the analysis. A bit mask can be generated (408) that notates the truncation of image data. The compressed image data, as truncated image data and a bitmask, can be sent (410) to a processor for reconstruction of a scene captured by the focal plane using a decompression process. In many embodiments, the decompression process can configure the processor to use the truncated image data to generate pixel values associated with pixel locations (as represented within image data used to generate an image) found using the bitmask to be missing an associated pixel value due to truncation.

Figure 5:
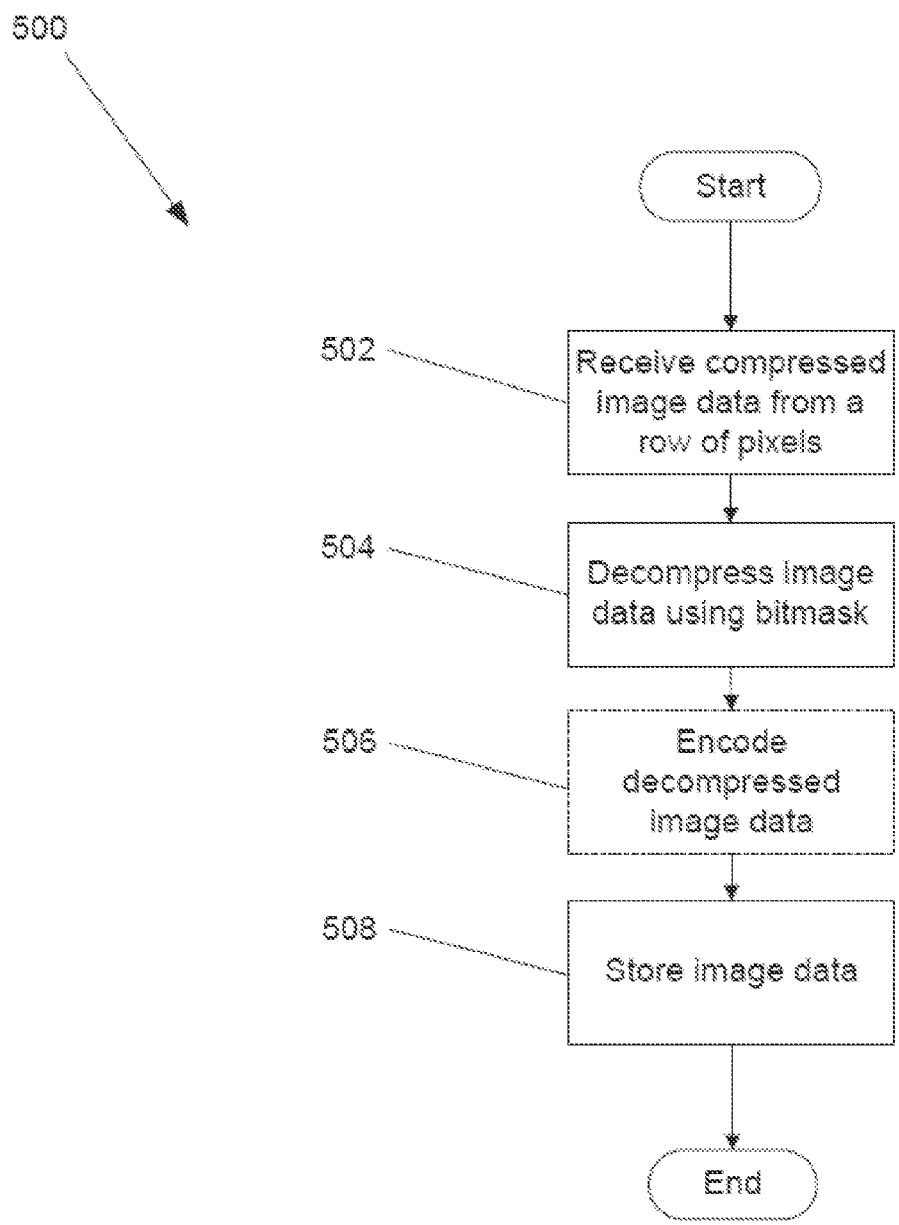
FIG. 5 illustrates a process for decompressing image data compressed in accordance with an embodiment of the invention.

A decompression process in accordance with an embodiment of the invention is illustrated in FIG. 5. The decompression process 500 includes receiving (502) compressed image data from a row (or column of pixels) and extracting a bit mask that can be used to decompress (504) truncated image data within the compressed image data based upon a known truncation rule, such as (but not limited to) the truncation rules described above. In several embodiments, the process (optionally) involves encoding the decompressed image data using an image encoding format such as (but not limited to) the lossless JPEG image encoding formats specified by the Joint Photographic Experts Group and/or the image compression format specified in U.S. Provisional Patent Application Ser. No. 61/767,520 entitled "Systems and Methods for Generating Captured Light Field Image Data Using Captured Light Fields", filed Feb. 21, 2013, the disclosure of which is incorporated by reference herein in its entirety. The (encoded) image data can then be stored for use in additional processing.

Although specific embodiments of array camera image data compression are discussed above, many other implementations of image data compression are possible in accordance with various embodiments of the invention. While the above description contains many specific embodiments of the invention, these should not be construed as limitations on the scope of the invention, but rather as an example of one embodiment thereof.

Packetizing Image Data Captured by Multiple Focal Planes

Figure 6:
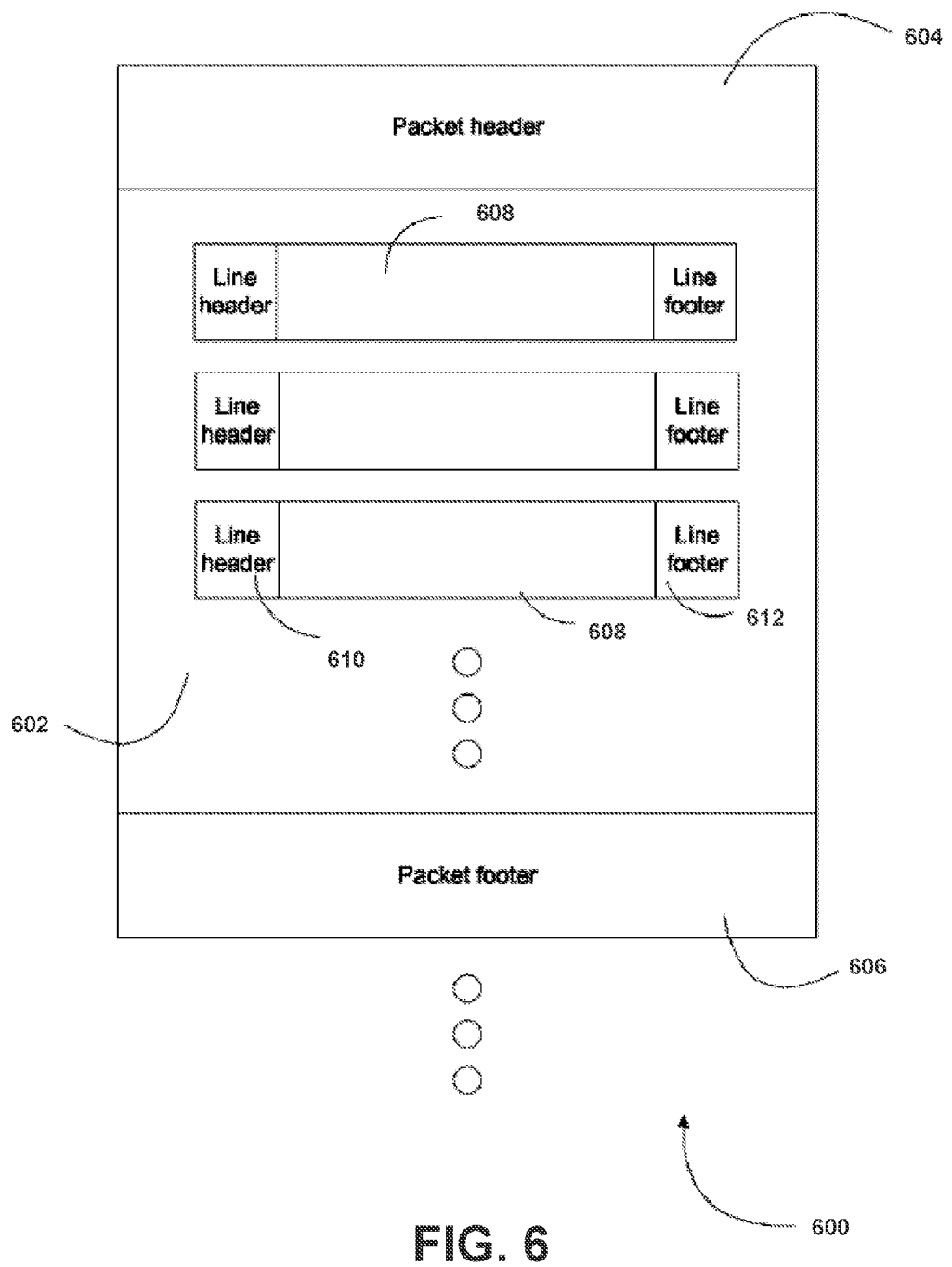
FIG. 6 illustrates image data transmitted as packets in accordance with an embodiment of the invention.

In several embodiments, image data from a plurality of focal planes can be packetized by inserting the image data and/or additional data describing the image data into a packet in such a way that a processor can reconstruct images of a scene from the received image data. A conceptual illustration of a packet including image data and additional data describing the image data transmitted by an imager array in accordance with an embodiment of the invention is illustrated in FIG. 6. The packet 602 includes a packet header 604 and a packet footer 606. The packet 602 also includes a number of lines 608 of image data, where each line 608 of image data includes a line header 610 and a line footer 612. In many embodiments, the packet header 604 and/or the line header 610 contain additional data that describes the image data in such a way that a device receiving the packet can reconstruct a plurality of images using image data including the lines of image data contained within the packet. The number of lines of image data included within the packet typically depends upon the requirements of a specific application. In many embodiments, the packet can contain all of the lines of image data for a single captured light field. The term light field can be used to describe a number of two dimensional images that are captured of a scene from different perspectives. In other embodiments, the lines of image data of a captured light field can be divided and sent in multiple packets. In many embodiments, image data captured by individual pixels or groups of pixels from within a line of pixels from different focal planes can be interleaved within a packet of image data.

In a number of embodiments, the packet header 604 contains embedded data. In many embodiments, the embedded data describes the camera module from which image data is generated in such a way that a processor can determine the structure of the image data in the packet and reconstruct images from the data received from the camera module. In several embodiments, a packet header 604 includes embedded data such as (but not limited to) the number of focal planes in an imager array, the timing of the image capture per focal plane, the identity of the particular focal planes being read out, the total number of pixels in a focal plane, the resolution of an image taken by a focal plane, the timing of the pixel read outs and the gain for the focal plane. As discussed below, the embedded data described above need not be included in a packet header and some or all of the information can be transmitted accompanying image data in different ways including but not limited to locating the additional data elsewhere in the packet and/or transmitting the additional data in a separate packet. Embedded data describing imaging data in accordance with embodiments of the invention is discussed further below.

In the illustrated embodiment, the lines 608 of image data include line headers 610. The line header identifies the focal plane or focal planes and pixels in the imager array that captured the image data contained within the line of image data. A processor can utilize the line header to identify the specific image data contained within the line 610 of image data. In various embodiments, a line header 610 includes information such as (but not limited to) the identify of the focal plane that captured the image data within the line and/or the identity of the specific pixels(s) or group of pixels used to capture the image data contained within the line of data, and a timestamp. Stated another way, a line of image data within a packet formatted in accordance with embodiments of the invention need not correspond to image data captured using a single line of pixels in a single focal plane. Indeed, packets of image data in accordance with embodiments of the invention can include lines of image data containing image data captured by different lines of pixels and/or from different focal planes. Inclusion of the additional data describing the line of image data in the line header allows a processor to receive and process image data from multiple images multiplexed into a single packet or stream of packets. Different types of embedded data that can be included in line headers (or elsewhere) in accordance with embodiments of the invention are discussed further below.

Each line 608 of image data can include a line footer 612 to indicate that the line of image data 608 associated with the preceding line header 610 has ended. Also, each packet 602 can include a packet footer 606 to indicate that the image data associated with the previous packet header 604 has ended. In many embodiments, the imager array is configured to generate multiple packets 602 to contain the image data captured by the focal planes and each packet includes multiple lines of image data.

Due to the manner in which image data is captured by different sets of pixels in different focal planes as data is transmitted by the imager array, the processor typically cannot predict the order in which it will receive image data from the imager array. In many embodiments, the processor has no knowledge of the focal plane or focal planes that captured the image data contained within a line of image data without reference to the packet header and/or the line header for the line of image data. However, in other embodiments the imager array imposes constraints with respect to the order in which image data is captured by specific focal planes (see for example the discussion below with respect to FIGS. 8a-8c) and a processor can rely upon the predetermined order of image data capture to reconstruct the image data. While imposing constraints on the order in which image data is captured can reduce the flexibility of the image array with respect to the manner in which image data is captured from different focal planes, the predictable manner in which image data is received from the imager array can result in the reduction in the amount of additional data transmitted in conjunction with the image data by removing information that identifies the focal plane and/or pixels that captured the image data. In many embodiments, the manner in which the imager array is constrained to capture image data enables the packet header, the packet footer, the line header and/or the line footer illustrated in FIG. 6 to be eliminated.

Although the inclusion of specific pieces of information within packet headers and/or line headers is described above, any information that enables the reconstruction of multiple images from image data multiplexed into a single packet or stream of packets can be incorporated into a packet of image data in accordance with embodiments of the invention. Transmission of image data compatible with the MIPI interface format is discussed further below.

Image Data Transmission Compatible with the MIPI Interface Format

Figure 7:
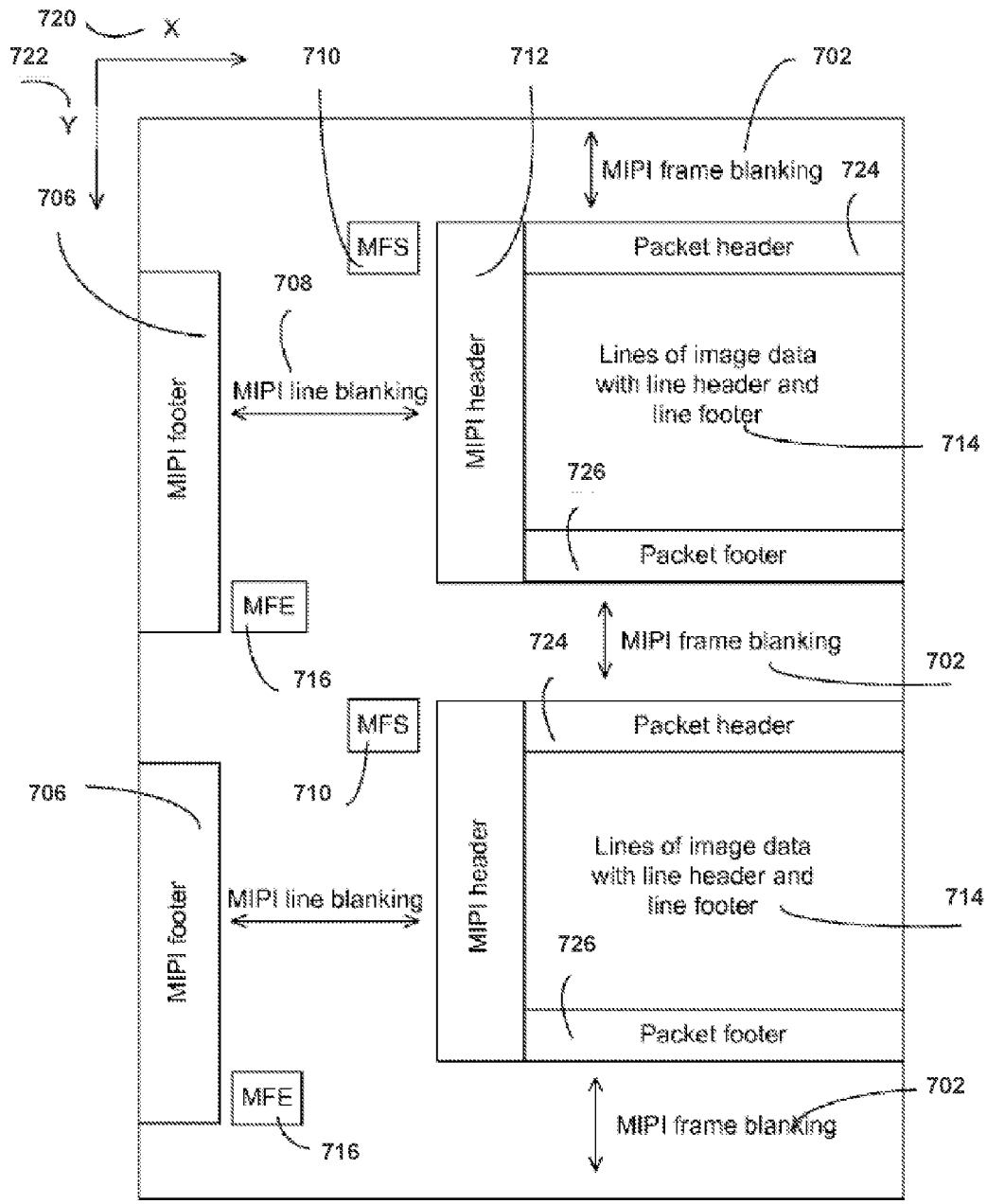
FIG. 7 illustrates transmission of image data as packets compatible with the MIPI CSI-2 standard interface format in accordance with an embodiment of the invention.

In several embodiments, imager arrays transmit image data and additional data describing the image data in a manner that is compatible with an existing interface format for the transmission of image data by a conventional camera including a single focal plane. A conceptual illustration of image data and additional data describing the image data transmitted as packets compatible with the MIPI CSI-2 standard interface format (MIPI interface format) in accordance with an embodiment of the invention is illustrated in FIG. 7. The conceptual illustration can be read as involving transmissions from left to right in the X direction 720 and from top to bottom in the Y direction 722. The transmission begins with a MIPI frame blanking interval 702. A MIPI frame start (MFS) 710 indicator is then sent by the imager array, followed by a portion of the MIPI header 712. A packet of data generated in accordance with embodiments of the invention is inserted within the standard MIPI container as embedded data. Accordingly, the first line of data within the MIPI container can include a packet header 724 containing information concerning the focal planes that generated the image data (see discussion above).

The transmission of the first line of the MIPI container is completed by the transmission of a MIPI footer 706. There is a pause during the MIPI line blanking interval 708, and then the next portion of the MIPI header 712 is transmitted. The next line of the MIPI container includes a line of image data 714. In embodiments where the order in which the lines of image data transmitted by the imager array is not predetermined, the line of image data can be preceded by a line header and followed by a line footer. In embodiments where the lines of image data are transmitted in a predetermined order (see for example the discussion of FIGS. 8a-8c), a line header and/or line footer may not be utilized.

The process of transmitting a MIPI footer, pausing during a MIPI line blanking interval, transmitting a portion of the MIPI header, and transmitting lines of image data within the MIPI container continues until all the lines of image data in the packet are transmitted. In several embodiments, an embedded packet footer is transmitted in the MIPI container to indicate that the transmission of the packet is complete. Following the transmission of the packet, the transmission of the MIPI container is completed by transmitting a MIPI footer 706 and a MIPI frame end 716. Although the packet illustrated in FIG. 7 involves transmitting one line of image data between line blanking intervals of the MIPI container, in many embodiments the packet header and the lines of image data do not correspond with the line blanking intervals of the MIPI container. Stated another way, a single line blanking interval of the MIPI container can contain image data from two or more lines of image data. Accordingly, the line headers and/or line footers are utilized to identify the individual lines of image data within the container.

As can readily be appreciated, the process illustrated in FIG. 7 involves formatting a packet of data including image data and additional data describing the image data generated in accordance with embodiments of the invention within a conventional MIPI container. In this way, an imager array can utilize an interface standard developed to enable the transmission of image data captured by a single focal plane to enable transmission of a packet of data containing image data captured by a plurality of focal planes (i.e. a light field). In other embodiments, similar processes can be utilized to transmit packets formatted in the manner outlined above using other containers and/or interface formats including (but not limited to) a CameraLink interface format, a USB interface format, or a Firewire interface format.

What is claimed is:

1. A system comprising:
   compression circuitry including at least one input via which the compression circuitry is configured to:
   receive image data captured by a plurality of cameras having different viewpoints, wherein the image data is in sequentially linear groups of pixel data, and wherein the pixel data are from corresponding pixel locations in a plurality of different images captured by the plurality of cameras;
   wherein the compression circuitry is further configured to:
   identify corresponding pixel locations in sequentially linear groups of pixel data received from different cameras in the plurality of cameras;
   identify redundant pixel data in at least one sequentially linear group of pixel data by determining similarity between the pixel data, wherein identifying whether a given pixel data in the sequentially linear groups of pixel data is redundant comprises:
   calculating a multiple of the given pixel data in the sequentially linear groups of pixel data,
   calculating a difference between the multiple of the given pixel data and at least one pixel data neighboring the given pixel data, and
   when the calculated difference is less than a threshold value, identifying the given pixel data as a redundant pixel data;
   truncate pixel data identified as redundant from the at least one sequentially linear group of pixel data to form compressed image data;
   multiplex compressed image data with pixel data from the identified corresponding pixel locations in sequentially linear groups of pixel data received from different cameras in the plurality of cameras; and
   transmit the multiplexed compressed image data and pixel data from the compression circuitry to a processing system via interface circuitry.

2. A method for compressing image data captured by a plurality of cameras comprising:
   receiving image data captured by a plurality of cameras having different viewpoints using a compression circuitry, wherein the image data is in sequentially linear groups of pixel data, and wherein the pixel data are from corresponding pixel locations in a plurality of different images captured by the plurality of cameras;
   identifying corresponding pixel locations in sequentially linear group of pixel data received from different cameras in the plurality of cameras using the compression circuitry, wherein identifying whether a given pixel data in the sequentially linear groups of pixel data is redundant comprises:
   calculating a multiple of the given pixel data in the sequentially linear groups of pixel data,
   calculating a difference between the multiple of the given pixel data and at least one pixel data neighboring the given pixel data, and
   when the calculated difference is less than a threshold value, identifying the given pixel data as a redundant pixel data;
   identifying redundant pixel data in at least one sequentially linear group of pixel data by determining similarity between the pixel data using the compression circuitry;
   truncating pixel data identified as redundant from the at least one sequentially linear group of pixel data to form compressed image data using the compression circuitry;
   multiplexing compressed image data with pixel data from the identified corresponding pixel locations in sequentially linear groups of pixel data received from different cameras in the plurality of cameras using the compression circuitry; and transmitting the multiplexed compressed image data and pixel data from the compression circuitry to a processing system via interface circuitry.

3. The method of claim 2, wherein the threshold value is a noise floor below which pixel data is indistinguishable from noise.

4. The method of claim 2, wherein:
the given pixel data is pixel data $N_{-1}$,
the multiple is 2,
the at least one pixel data neighboring the given pixel data include pixel data N and pixel data $N_{-2}$, and
the difference K is calculated according to the following truncation rule: $K=(2*N_{-1})-N-N_{-2}$.

5. The method of claim 2, wherein the multiplexed compressed image data and pixel data is transmitted in a stream of packets.

6. The method of claim 5, wherein the stream of packets comprises a header describing how image data from the plurality of cameras is multiplexed within the stream of packets.

7. The method of claim 2 further comprising storing the received image data in a shift register prior to identifying redundant pixel data in at least one sequentially linear group of pixel data.

8. The system of claim 1, wherein the threshold value is a noise floor below which pixel data is indistinguishable from noise.

9. The system of claim 1, wherein:
given pixel data is pixel data $N_{-1}$,
the multiple is 2,
the at least one pixel data neighboring the given pixel data include pixel data N and pixel data $N_{-2}$, and
the difference K is calculated according to the following truncation rule: $K=(2*N_{-1})-N-N_{-2}$.

10. The system of claim 1, wherein the compression circuitry is further configured to transmit the multiplexed compressed image data and pixel data in a stream of packets.

11. The system of claim 10, wherein the stream of packets comprises a header describing how image data from the plurality of cameras is multiplexed within the stream of packets.

12. The system of claim 1, wherein the compression circuitry is further configured to store the received image data in a shift register prior to identifying redundant pixel data in at least one sequentially linear group of pixel data.

* * * * *